(12) United States Patent
Cheng et al.

(10) Patent No.: US 12,703,275 B2
(45) Date of Patent: Aug. 11, 2026

(54) SIDE PROTECTION MECHANISM FOR SAFETY SEAT AND SAFETY SEAT WITH SIDE PROTECTION MECHANISM

(71) Applicant: Wonderland Switzerland AG, Steinhausen (CH)

(72) Inventors: Manqun Cheng, Dongguan (CN); Tao Wang, Dongguan (CN)

(73) Assignee: Wonderland Switzerland AG, Steinhausen (CH)

( * ) Notice: Subject to any disclaimer, the term of this patent is extended or adjusted under 35 U.S.C. 154(b) by 239 days.

(21) Appl. No.: 18/721,046

(22) PCT Filed: Dec. 15, 2022

(86) PCT No.: PCT/EP2022/086134

§ 371 (c)(1),
(2) Date: Jun. 17, 2024

(87) PCT Pub. No.: WO2023/111172

PCT Pub. Date: Jun. 22, 2023

(65) Prior Publication Data

US 2025/0058683 A1 Feb. 20, 2025

(30) Foreign Application Priority Data

Dec. 17, 2021 (CN) ......................... 202111551356.0

(51) Int. Cl.
*B60N 2/28* (2006.01)
*B60N 2/90* (2018.01)

(52) U.S. Cl.
CPC ........... *B60N 2/2884* (2013.01); *B60N 2/919* (2018.02); *B60N 2002/924* (2018.02)

(58) Field of Classification Search
CPC .............................. B60N 2/2884; B60N 2/919
(Continued)

(56) References Cited

U.S. PATENT DOCUMENTS 12,128,797 B2 10/2024 Cui
12,145,485 B2 11/2024 Zhang
(Continued)

FOREIGN PATENT DOCUMENTS

CN 108790970 A 11/2018
CN 110962709 A 4/2020
(Continued)

OTHER PUBLICATIONS

Office Action issued in corresponding Chinese Application No. 202111551356.0 dated Nov. 20, 2024, along with partial English translation.

(Continued)

*Primary Examiner* — Anthony D Barfield
(74) *Attorney, Agent, or Firm* — Volpe Koenig

(57) ABSTRACT

A side protection mechanism for safety seat includes a pivotal connection mount, a side protection block pivotally connected to the pivotal connection mount, and a motor disposed in the pivotal connection mount. The motor is connected to the side protection block to drive the side protection block to rotate relative to the pivotal connection mount to fold or unfold. A safety seat includes a seat body and the side protection mechanism on a side of seat body. After the side protection block rotates to unfold, the side protection block protrudes from the seat body and a locking block of the side protection block is located outside and directly in front of a locking slot of the connection mount.

20 Claims, 15 Drawing Sheets

(58) Field of Classification Search
USPC .................................................... 297/216.13
See application file for complete search history.

(56) References Cited

U.S. PATENT DOCUMENTS

| | | | | |
|---|---|---|---|---|
| 2015/0336482 | A1* | 11/2015 | Pos | B60N 2/2884 297/250.1 |
| 2016/0039319 | A1 | 2/2016 | Zhang | |
| 2018/0244178 | A1* | 8/2018 | Pos | B60N 2/2884 |
| 2021/0016692 | A1* | 1/2021 | Guo | B60N 2/2884 |

FOREIGN PATENT DOCUMENTS

| | | | |
|---|---|---|---|
| CN | 111845480 | A | 10/2020 |
| CN | 111845481 | A | 10/2020 |
| CN | 212950272 | U | 4/2021 |
| CN | 112937391 | A | 6/2021 |
| DE | 102019111397 | A1 | 12/2023 |
| EP | 3738819 | A1 | 11/2020 |
| WO | 2010087965 | A2 | 8/2010 |
| WO | 2021094523 | A1 | 5/2021 |

OTHER PUBLICATIONS

Office Action issued in corresponding Taiwanese Application No. 111147988 dated Aug. 16, 2023.
International Search Report and Written Opinion for Application No. PCT/EP2022/086134 dated Apr. 11, 2023.

* cited by examiner

SIDE PROTECTION MECHANISM FOR SAFETY SEAT AND SAFETY SEAT WITH SIDE PROTECTION MECHANISM

CROSS-REFERENCE TO RELATED APPLICATIONS

This application is a 371 U.S. national stage of International Application No. PCT/EP2022/086134, filed on Dec. 15, 2021, which claims priority to Chinese patent application No. 2021115513560, filed on Dec. 17, 2021, the contents of which are hereby incorporated by reference in their entirety.

FIELD

The present disclosure relates to a safety seat, and more particularly to a safety seat with side protection function and a side protection mechanism thereof.

BACKGROUND

Safety eats have become a must-have apparatus for children in a car. They provide a safe and comfortable seating space for children. The safety seat restrains an infant by means of a restraint device. In the case of emergency braking or accidental collision of the car, the safety seat reduces the impact on the infant through its casing and restricts the body movement of the infant through its restraint device, so as to reduce the injury to the infant in the accident and ensure the safety of the infant in the car. Some safety seats are provided with side protection blocks on both sides in order to provide side impact protection. Some side protection blocks are designed to be foldable to reduce the space occupied by the safety seat during storage. This type of side protection block usually requires the user to actively open or close the side protection block. However, sometimes the user may forget to unfold the side protection block during use, which makes the side protection function of the side protection block fail or greatly reduced.

SUMMARY

As will be seen more clearly from the detailed description following below, according to an embodiment, the claimed side protection mechanism is applied to a safety seat and includes a pivotal connection mount, a side protection block, and a motor. The pivotal connection mount has a locking slot. The side protection block is pivotally connected to the pivotal connection mount and includes a locking block. The motor is disposed in the pivotal connection mount. The motor is connected to the side protection block to drive the side protection block to rotate relative to the pivotal connection mount to fold or unfold. Therein, after the side protection block rotates to unfold, the locking block is located outside the locking slot and directly in front of the opening of the locking slot.

According to another embodiment, the claimed safety seat includes a seat body and the above side protection mechanism. The pivotal connection mount of the side protection mechanism is disposed on a side of the seat body. Therein, after the side protection block rotates to unfold, the side protection block protrudes from the seat body. Similarly, by controlling the operation of the motor, the side protection block can be driven to fold or unfold, which is convenient for the user to operate, and effectively solves the problem that the side protection function of the side protection block fails or is greatly reduced due to user negligence.

BRIEF DESCRIPTION OF THE DRAWINGS

In the following, the disclosure is further illustrated by way of example, taking reference to the accompanying drawings thereof.

DETAILED DESCRIPTION

Figure 1:
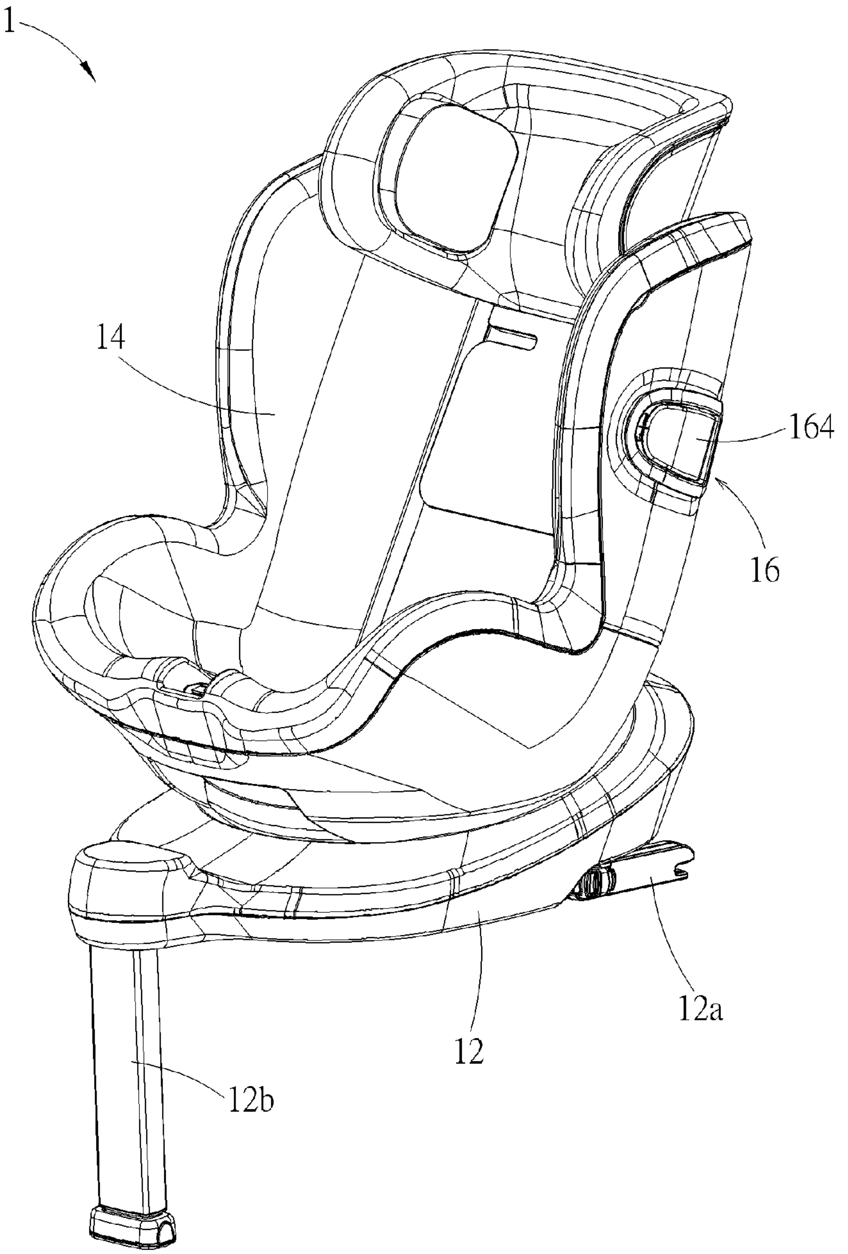
FIG. 1 is a schematic diagram illustrating a safety seat of an embodiment according to the disclosure.
Figure 2:
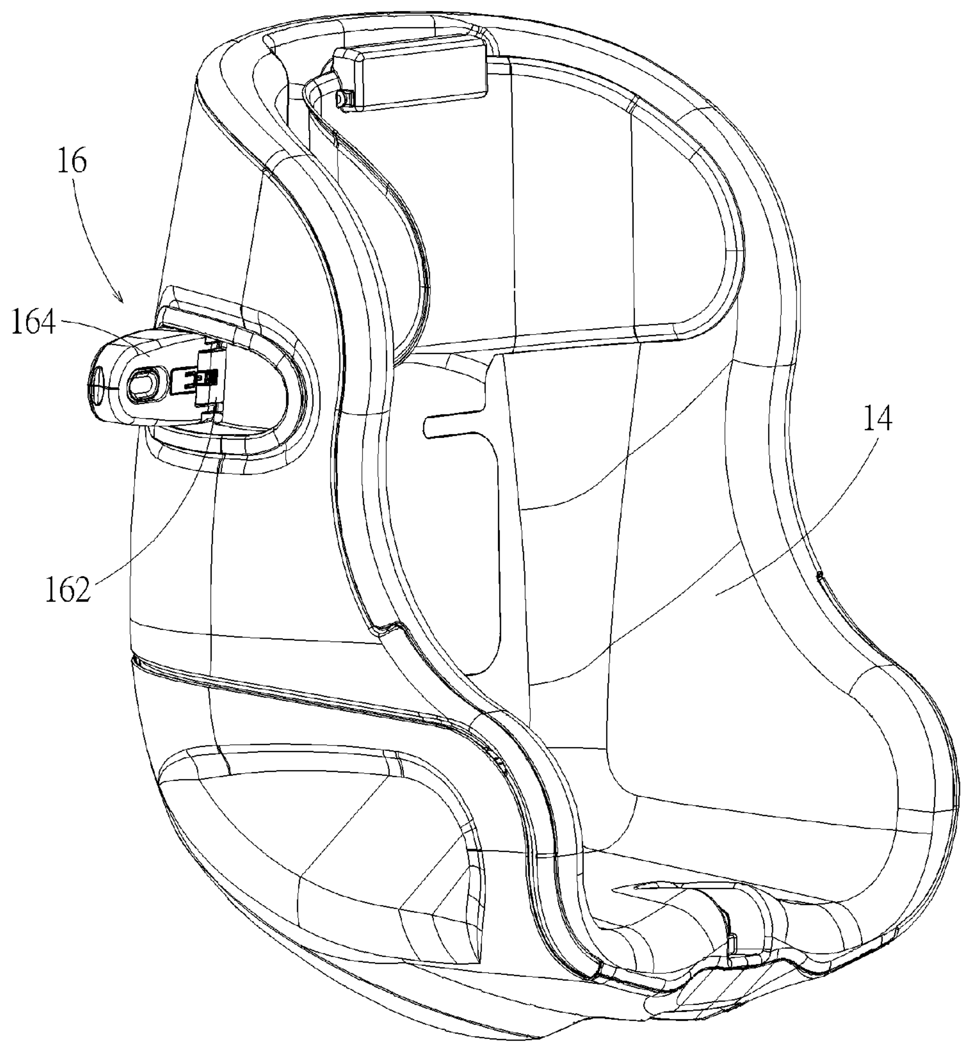
FIG. 2 is a schematic diagram illustrating the safety seat in FIG. 1 after a side protection block thereon is unfolded.

Please refer to FIG. 1 and FIG. 2. A safety seat 1 of an embodiment according to includes a base 12, a seat body 14, and two side protection mechanisms 16. The base 12 can be placed on a back seat of a car. An anchoring device **12*a* of the base 12 can be secured to an anchor structure of the car seat. The base 12 also has a supporting leg 12*b*. The supporting leg 12*b* can against the floor near the car seat and support the base 12. The seat body 14 is detachably connected to the base 12. The side protection mechanisms 16 is disposed on both sides of the seat body 14. The side protection mechanism 16 can be operated to provide side protection for the seat body 14**.

Figure 3:
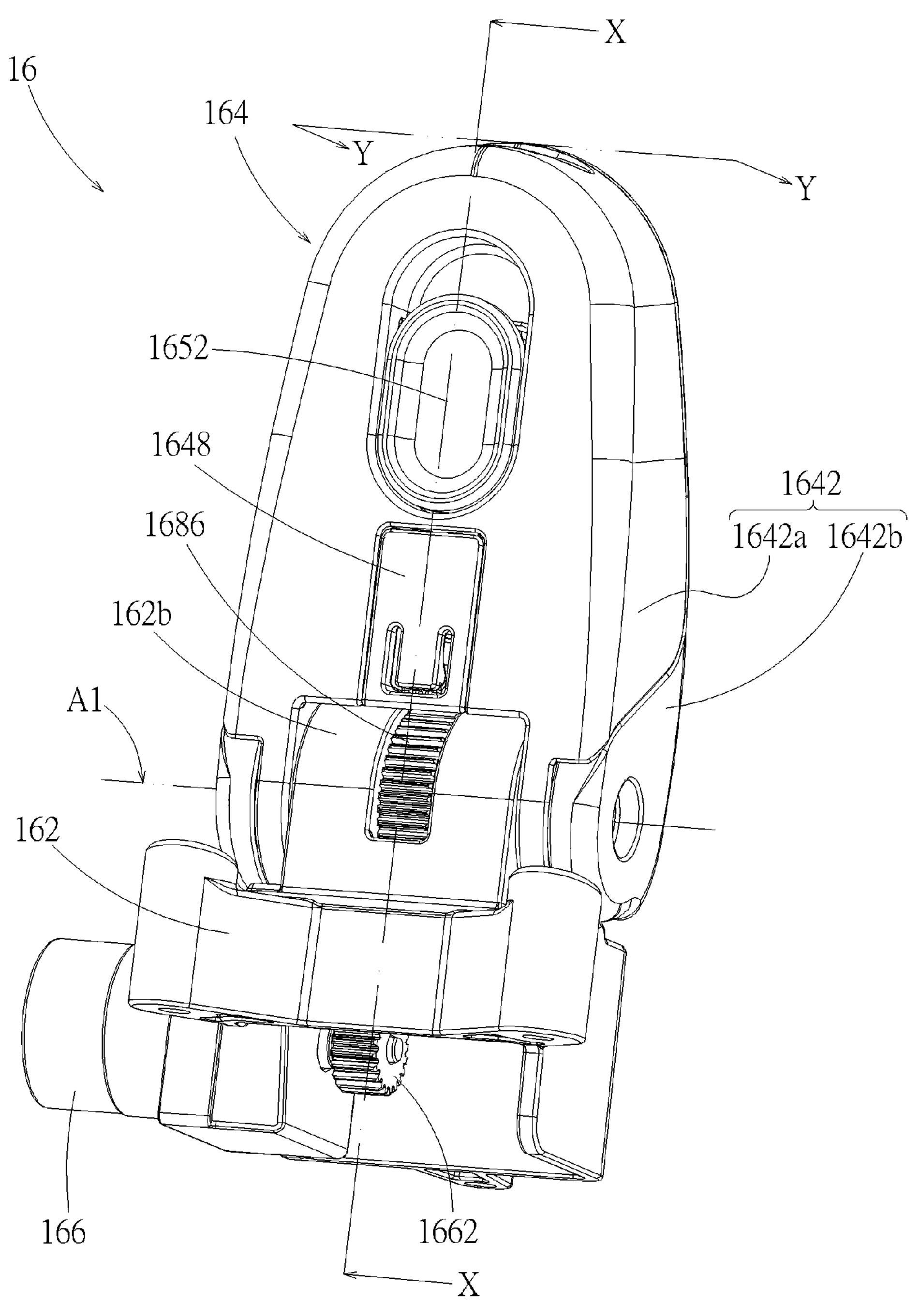
FIG. 3 is a schematic diagram illustrating a side protection mechanism in FIG. 2.

Please also refer to FIG. 3. In the embodiment, the side protection mechanism 16 includes a pivotal connection mount 162, a side protection block 164, and a motor 166.

The pivotal connection mount 162 is disposed on the seat body 14. The pivotal connection mount 162 can be structurally integrated into the casing of the seat body 14. However, it is not limited thereto in practice. For example, the pivotal connection mount 162 can be another structural part (relative to the seat body 14) and is simply fixed on the casing of the seat body 14 with screws. The side protection block 164 and the pivotal connection mount 162 are pivotally connected, so that the side protection block 164 can rotate with respect to a rotation axis A1 (indicated by a chain line in FIG. 3). The motor 166 is disposed on the pivotal connection mount 162. The motor 166 is connected (including directly and indirectly) to the side protection block 164, so as to drive the side protection block 164 to rotate relative to the pivotal connection mount 162 to fold (as the folded state in FIG. 1) or unfold (as the unfolded state in FIG. 2). In practice, the operation of the motor 166 can be controlled by a control module (e.g., achieved by a circuit board). The control module can be further connected in communication with a smart phone, so that the user can control the state (e.g., the above folded state or unfolded state) of the side protection block 164 through the smart phone. After the side protection block 164 rotates to unfold, the side protection block 164 protrudes outwards from the seat body 14, thereby providing side protection for the seat body 14. In addition, the safety seat 1 can be equipped with an energy storage device (such as storage battery) or can be connected to the power system of the car (e.g., through an car's 12V socket), for supplying the power required for the operation of the electronic devices (including the motor 166, circuit board modules) on the safety seat 1, which will not be described in addition.

Please refer to FIG. 3 to FIG. 8. In the embodiment, the motor 166 is connected to the side protection block 164 through the gear set 168. The side protection block 164 includes a casing 1642, a locking block 1644, and a connecting link 1646. The casing 1642 is formed by the combination of a front cover 1642*a* and a back cover 1642*b* and is pivotally connected to the pivotal connection mount 162. The locking block 1644 is movably disposed in the casing 1642. The connecting link 1646 connects the locking block 1644 and the gear set 168. The motor 166 drives the side protection block 164 through the gear set 168, the connecting link 1646, and the locking block 1644 to rotate relative to the pivotal connection mount 162.

Figure 5:
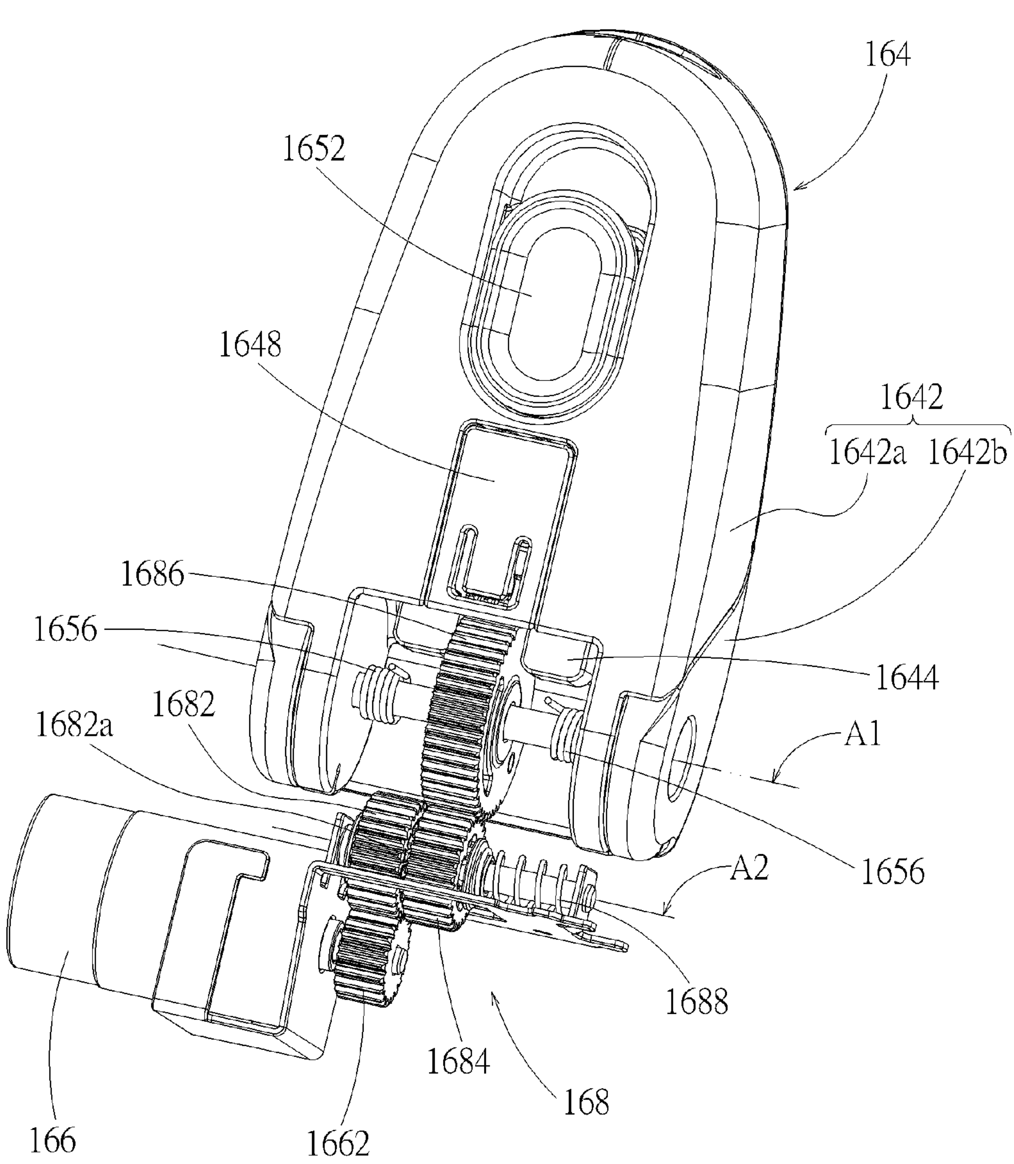
FIG. 5 is a schematic diagram illustrating the side protection mechanism in FIG. 3 after some components of a pivotal connection mount thereof are removed.
Figure 7:
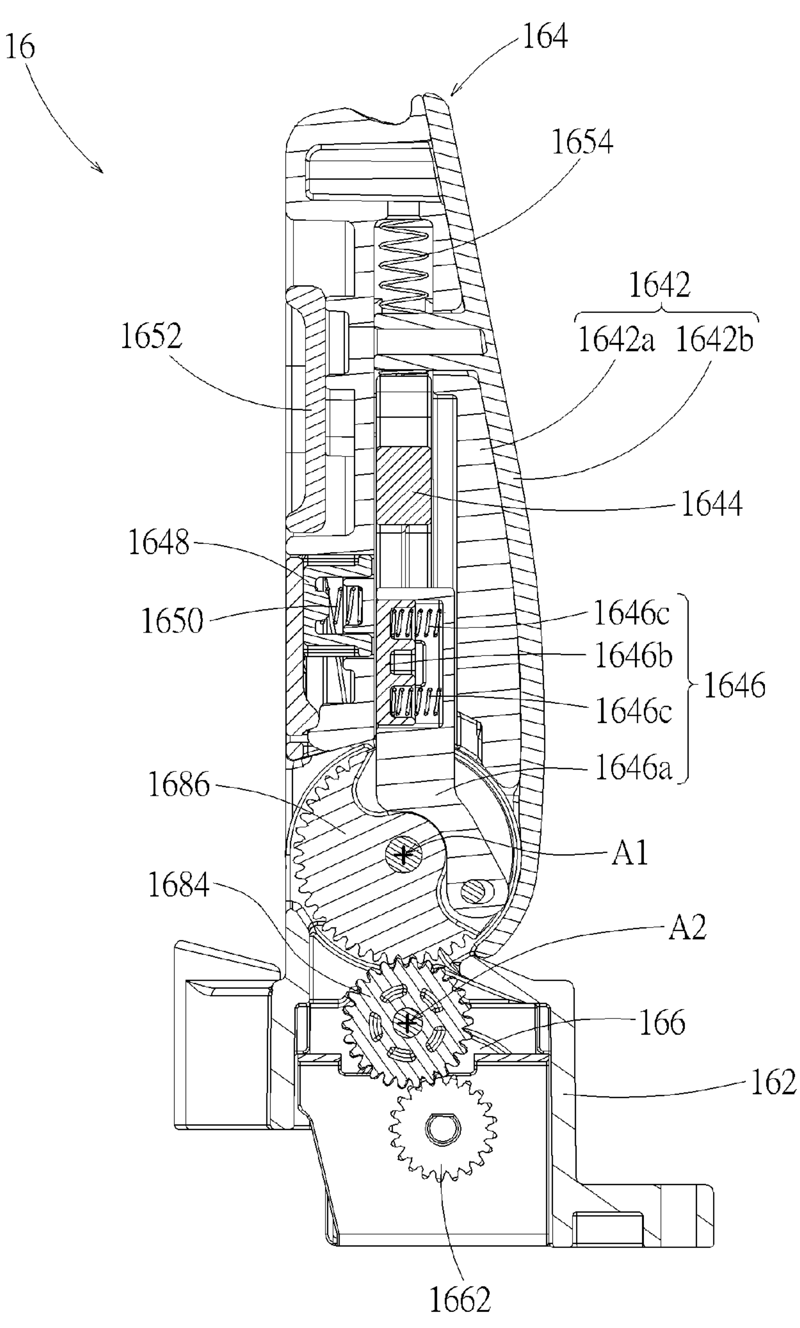
FIG. 7 is a sectional view of the side protection mechanism along the line X-X in FIG. 3.
Figure 8:
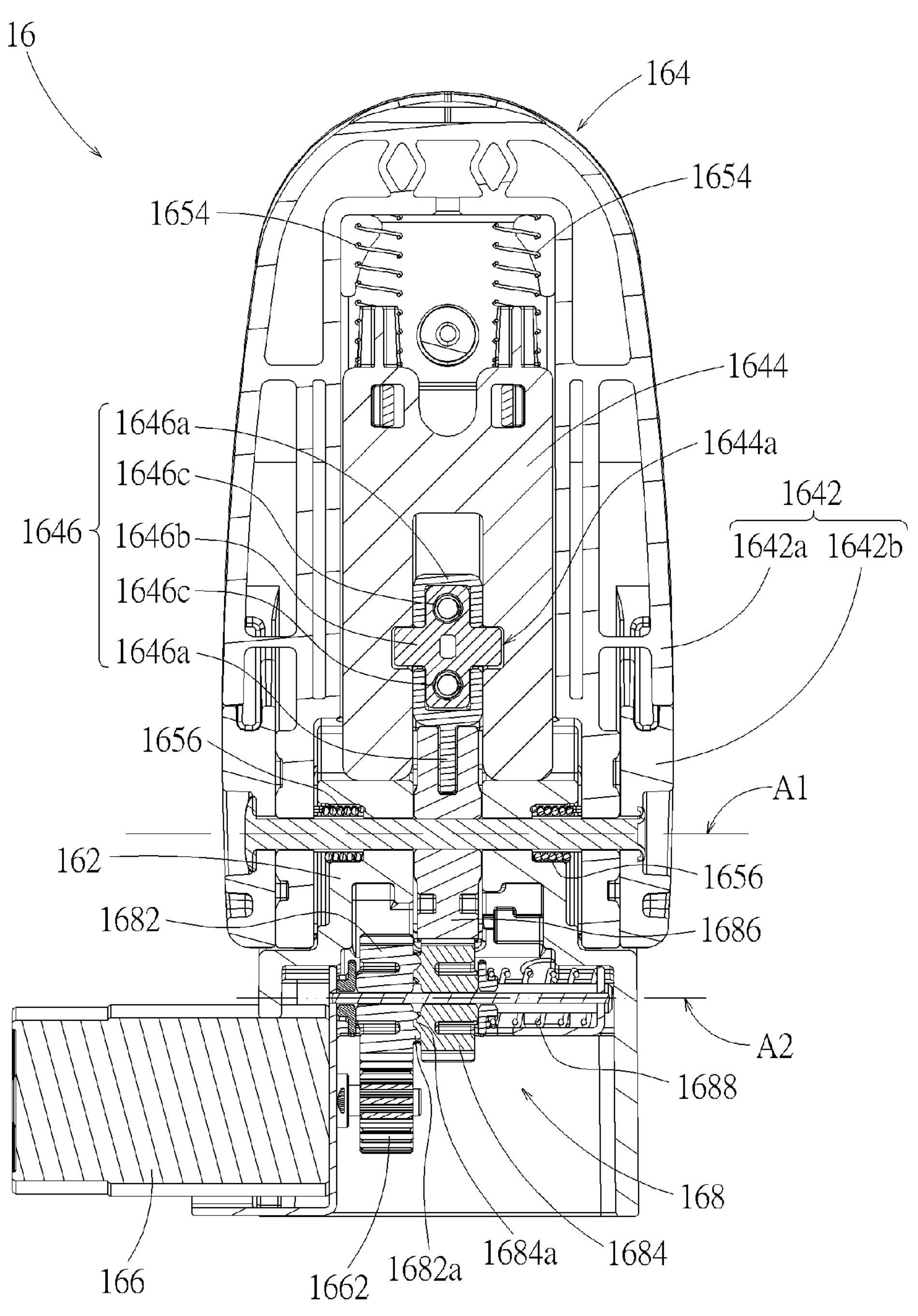
FIG. 8 is a sectional view of the side protection mechanism along the line Y-Y in FIG. 3.

Please refer to FIG. 5, FIG. 7 and FIG. 8. Therein, the gear set 168 includes a driving gear 1682, a clutch gear 1684, and a driven gear 1686. The driving gear 1682 and the clutch gear 1684 are arranged coaxially (i.e., on a rotation axis A2, indicated by a chain line in FIG. 5 and FIG. 8 and by a cross mark in FIG. 7) and axially detachably engage with each other (i.e. along the rotation axis A2). The clutch gear 1684 engages with the driven gear 1686. The driven gear 1686 is connected to the connecting link 1646 to be capable of driving the connecting link 1646. In the embodiment, the connecting link 1646 is rotatably connected with the driven gear 1686. The driven gear 1686 is disposed on the rotation axis A1 (i.e., the rotation axis of the driven gear 1686 coincides with the rotation axis A1), and the rotation axis A1 and the rotation axis A2 are parallel; however, it is not limited thereto in practice. For example, the driven gear 1686 is disposed away from the rotation axis A1, but the driven gear 1686 can still drive the connecting link 1646. For another example, the rotation axis A1 and the rotation axis A2 may be non-parallel. The clutch gear 1684 and the driven gear 1686 are implemented by suitable gear types (e.g., bevel gears) accordingly, so that they can still drive each other effectively.

Please refer to FIG. 5, FIG. 7 and FIG. 8. The motor 166 engages with the driving gear 1682 through a pinion 1662 (disposed on the rotating shaft of the motor 166). Thereby, the motor 166 can drive the gear set 168 and drive the side protection block 164 through the gear set 168 to rotate relative to the pivotal connection mount 162. In the embodiment, the pinion 1662 and the driving gear 1682 are spur gears; however, it is not limited thereto in practice. For example, the engagement between the motor 166 and the gear set 168 may be achieved by bevel gears, a worm-and-gear set, or other gear sets capable of meshing with and driving each other, which will not be described in addition. Furthermore, in the embodiment, the rotating shaft of the motor 166 may be fixedly connected directly to the driving gear 1682, so as to directly rotate the driving gear 1682.

Please refer to FIG. 8. Furthermore, in the embodiment, the driving gear 1682 and the clutch gear 1684 detachably engage with each other through wave teeth 1682*a* and 1684*a* protruding parallel to the rotation axis A2. The driving gear 1682 and the clutch gear 1684 can disengage from each other by the wave teeth 1682*a* and 1684*a* relatively moving. The gear set 168 includes a restoring element 1688 (e.g., a spring), which abuts against the clutch gear 1684, so as to make the clutch gear 1684 engage with the driving gear 1682. Thereby, the driving gear 1682 and the clutch gear 1684 can drive each other, and relative rotation between the driving gear 1682 and the clutch gear 1684 is also allowed. In other words, the separable engagement of the driving gear 1682 and the clutch gear 1684 can prevent the motor 166 from stalling and can disconnect the transmission of power from the motor 166 when the side protection block 164 is disturbed. In practice, the restoring element 1688 may be disposed on the side of the driving gear 1682 and abuts against the driving gear 1682 to drive the driving gear 1682 to engage with the clutch gear 1684. This structural configuration can prevent the motor 166 from stalling. In addition, the embodiment discloses the design of the gear set 168 (having the functions of transmission and clutch), but the disclosure is not limited thereto. Any design that is different from the gear set 168 but can achieve the effect of the disclosure is included in the disclosure.

Figure 4:
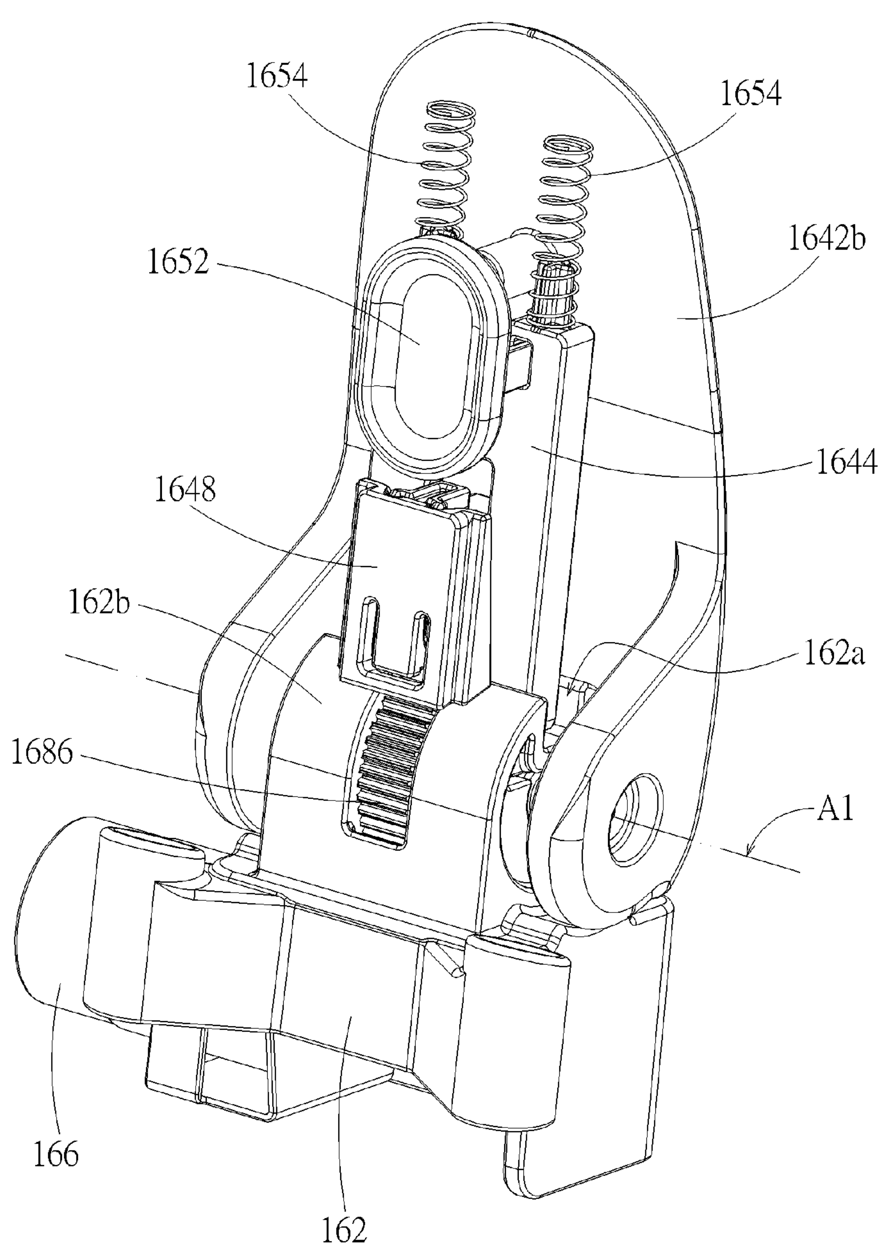
FIG. 4 is a schematic diagram illustrating the side protection mechanism in FIG. 3 after some components of the side protection block are removed.
Figure 9:
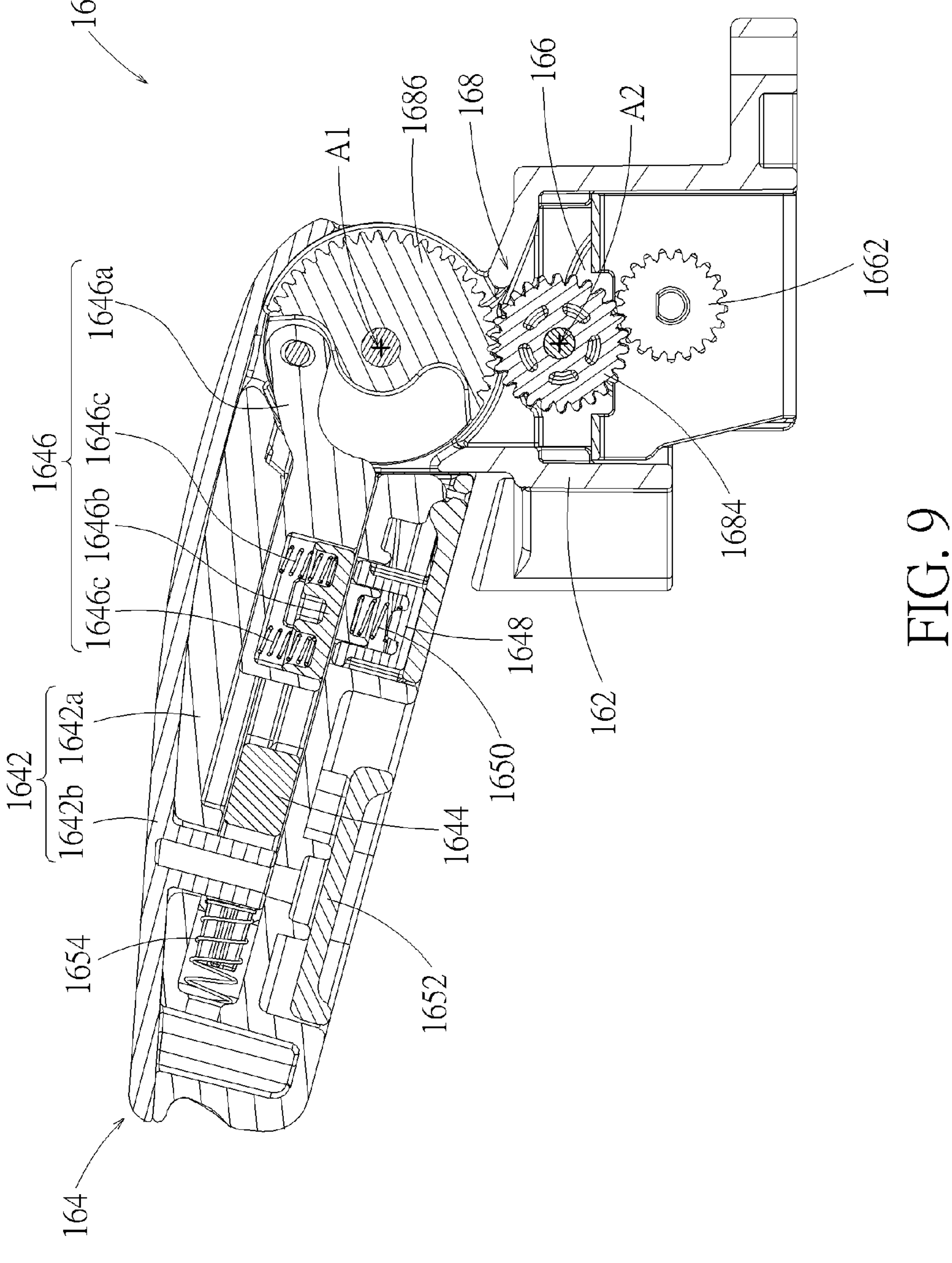
FIG. 9 is a sectional view of the side protection mechanism in FIG. 7 after the side protection block is folded.
Figure 10:
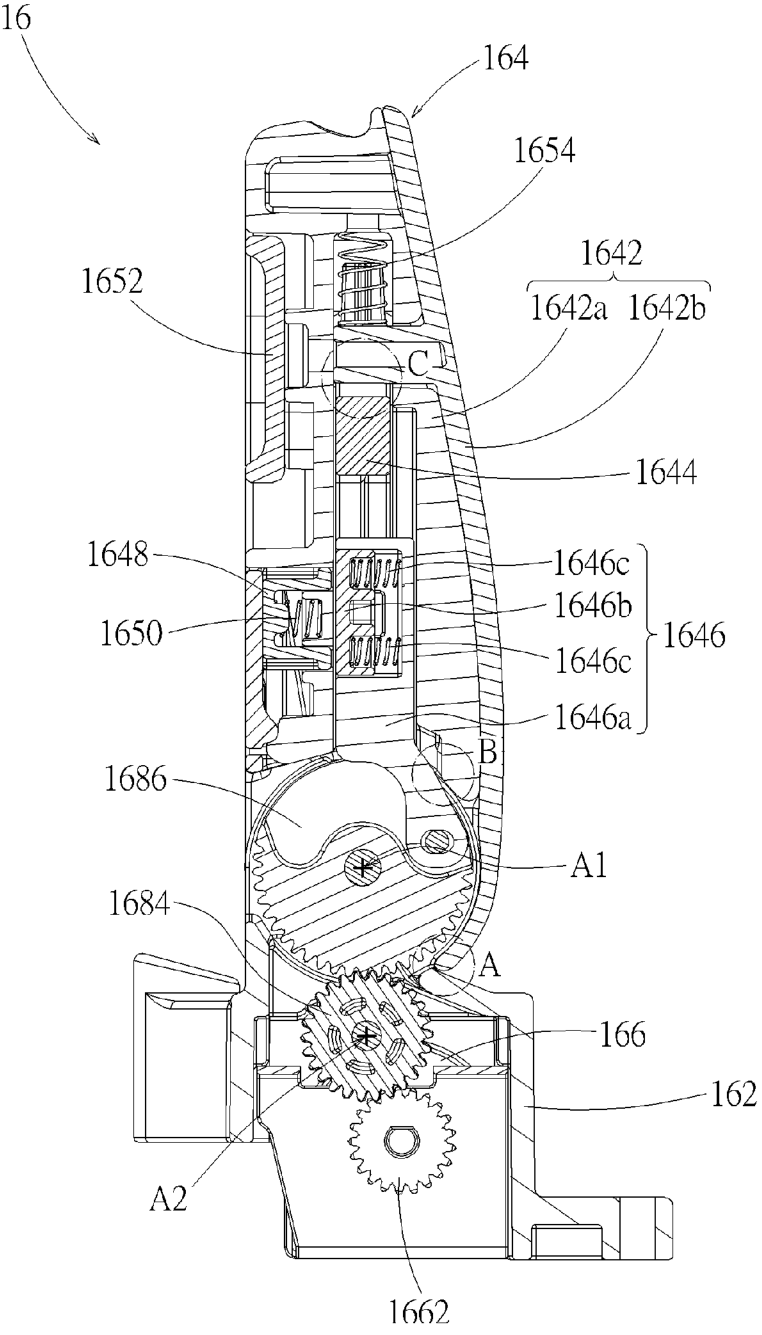
FIG. 10 is a sectional view of the side protection mechanism in FIG. 7 before the locking block is inserted into the locking slot.
Figure 11:
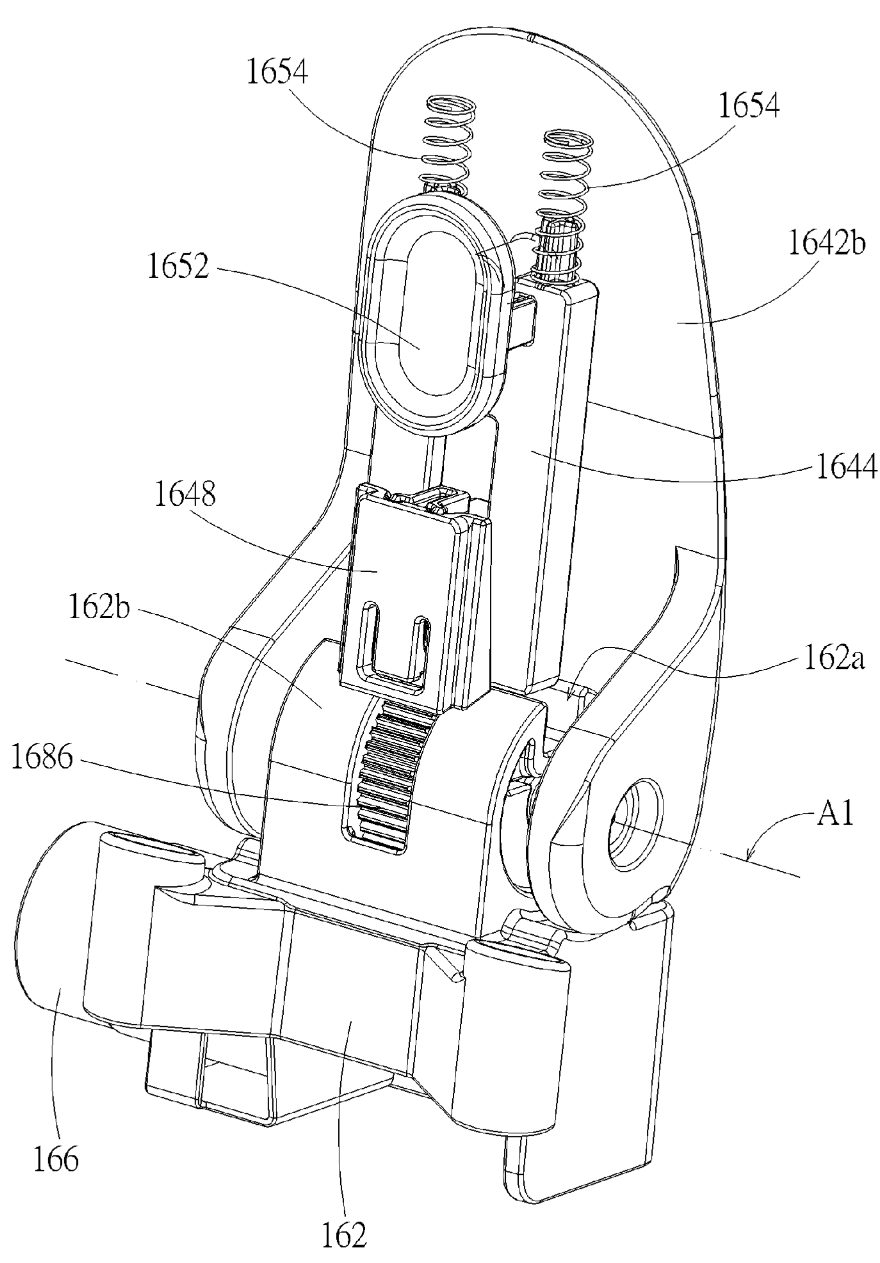
FIG. 11 is a schematic diagram illustrating the side protection mechanism in FIG. 10 after some components of the side protection block are removed.

Please refer to FIG. 3, FIG. 4, and FIG. 7 to FIG. 11. In the embodiment, the pivotal connection mount 162 has a locking slot 162*a* and an outer surface 162*b*. The outer surface 162*b* is adjacent to the locking slot 162*a*. In general, a sectional view of the side protection mechanism 16 after the side protection block 164 is folded is shown by FIG. 9. At this moment, if the motor 166 drives the gear set 168 to make the driven gear 1686 rotates clockwise, the driven gear 1686 drives the locking block 1644 through the connecting link 1646 to make the locking block 1644 rotate with respect to the rotation axis A1, so as to unfold the side protection block 164 (e.g., rotating from FIG. 9 to FIG. 10). After the side protection block 164 rotates to the unfolded position (as shown by FIG. 10 and FIG. 11), the locking block 1644 is located outside the locking slot 162*a* and directly in front of the opening of the locking slot 162*a*. At this moment, in principle, because the side protection block 164 and the motor 166 are connected, the motor 166 provides a certain degree of positioning function for the side protection block 164, which helps the side protection block 164 to remain in the unfolded position. Then, when the motor 166 continues driving the driven gear 1686 to rotate, the driven gear 1686 will drive the connecting link 1646 to drive the locking block 1644 to move toward the pivotal connection mount 162 into the locking slot 162*a* (as shown by FIG. 4 and FIG. 7), which better ensures that the side protection block 164 remains in the unfolded state. In addition, in FIG. 10, corresponding to a situation where the side protection block 164 rotates to the unfolded position, the pivotal connection mount 162 may abuts against the casing 1642 (or the back cover 1642*b* thereof) in practice (as shown in the circle A in FIG. 10, which can avoid excessive rotation when the side protection block 164 is manually operated), which can also help the side protection block 164 to stop at the unfolded position.

The side protection block 164 in FIG. 7 is in a locked state. Afterwards, if it is required to fold the side protection block 164, similarly, the motor 166 can be controlled to drive the side protection block 164 through the gear set 168 to act reversely. Therein, in FIG. 7, the motor 166 drives the driven gear 1686 through the gear set 168 to rotate counterclockwise. The driven gear 1686 drives the locking block 1644 through the connecting link 1646 to move upward, so as to make the locking block 1644 separated from the locking slot 162*a* (i.e., the state shown by FIG. 10 and FIG. 11).

The side protection block 164 in FIG. 10 and FIG. 11 is in an unlocked state. Afterwards, if the motor 166 continues driving the driven gear 1686 through the gear set 168 to rotate counterclockwise, the side protection block 164 will rotate together with the driven gear 1686 until the side protection block 164 is unfolded (as shown by FIG. 9). As described above, the unfolding and folding of the side protection block 164 can be driven by electricity, that is, the side protection mechanism 16 can realize the unfolding (i.e., the state of the side protection block 164 changing from FIG. 9 to FIG. 10 to FIG. 7) and folding (i.e., the state of the side protection block 164 changing from FIG. 7 to FIG. 10 to FIG. 9) of the side protection block 164 by controlling the operation of the motor 166.

Furthermore, please refer to FIG. 3, FIG. 4, and FIG. 6 to FIG. 8. In the embodiment, the connecting link 1646 includes a link body 1646*a* and a connecting portion 1646*b*. The connecting portion 1646*b* is movably disposed on the link body 1646*a*. The link body 1646*a* is connected to the driven gear 1686 and is connected to the locking block 1644 through the connecting portion 1646*b*. The locking block 1644 has a docking portion 1644*a*. The connecting portion 1646*b* includes two protruding blocks at opposite of the link body 1646*a*. The docking portion 1644*a* includes two opposite recesses. The connecting portion 1646*b* is detachably connected to the docking portion 1644*a* by the protruding blocks fitting in the recesses. Corresponding to a situation where the connecting portion 1646*b* is disengaged from the docking portion 1644*a* (referring to the state shown by FIG. 12), the connecting link 1646 and the locking block 1644 are not connected, and the locking block 1644 can move relative to the connecting link 1646.

Please refer to FIG. 3, FIG. 4, and FIG. 7. In the embodiment, side protection block 164 includes a press part 1648 (which is formed by combining two structural parts) exposed from a surface of the casing 1642. In practice, corresponding to a situation where the locking block 1644 is located outside and directly in front of the locking slot 162*a* (as shown by FIG. 10 and FIG. 11), the user presses the press part 1648 to push against and move the connecting portion 1646*b*, so as to make the connecting portion 1646*b* disengaged from the docking portion 1644*a* (referring to the state shown by FIG. 12). Furthermore, the connecting link 1646 includes a restoring element 1646*c* (e.g., a spring) abutting against and between the link body 1646*a* and the connecting portion 1646*b*, for driving the connecting portion 1646*b* to move back to its original position and connect with the docking portion 1644*a*. Similarly, the side protection block 164 also includes a restoring element 1650 (e.g., a spring) abutting against and between the press part 1648 and the casing 1642, for driving the press part 1648 back to its original position.

Furthermore, please refer to FIG. 4, FIG. 7 and FIG. 8. In the embodiment, the side protection block 164 includes an operating part 1652 and two restoring elements 1654 (e.g., springs). The operating part 1652 is connected to the locking block 1644 and exposed from the surface of the casing 1642. The operating part 1652 can move together with the locking block 1644. After the connecting portion 1646*b* is disengaged from the docking portion 1644*a* (referring to the state shown by FIG. 12), the user can move the operating part 1652 to make the operating part 1652 and the locking block 1644 move in the same direction. The restoring elements 1654 abut against and between the locking block 1644 and the casing 1642. Corresponding to a situation where the locking block 1644 is aligned with the locking slot 162*a* (as shown by FIG. 10 and FIG. 11) and the connecting portion 1646*b* is disengaged from the docking portion 1644*a* (referring to the state shown by FIG. 12), the restoring elements 1654 push the locking block 1644 into the locking slot 162*a* (as shown by FIG. 13, also referring to FIG. 4 where the locking block 1644 is inserted into the locking slot 162*a*). In addition, because the operating part 1652 is exposed from the casing 1642 and moves together with the locking block 1644, the operating part 1652 also has an indication function, indicating whether the locking block 1644 is inserted into the locking slot 162*a*.

Thereby, the unfolding, folding of the side protection block 164 can be achieved manually. For example, when the side protection block 164 is in the folded state (as shown by FIG. 9), the user can directly rotate (e.g. by hand) the side protection block 164 to the unfolded position (as shown by FIG. 10). Therein, during the above rotation, the driven gear 1686 will rotate together with the side protection block 164, and the clutch gear 1684 will be driven by the driven gear 1686 to rotate, but because of the clutching action (i.e., the separable engagement of the wave teeth 1682*a* and 1684*a*, as shown in FIG. 8) between the driving gear 1682 and the clutch gear 1684, the rotation of the clutch gear 1684 will not damage the motor 166. After the user rotates the side protection block 164 to the unfolded position (as shown by FIG. 10 and FIG. 11), the user can press the press part 1648 to make the connecting portion 1646*b* (of the connecting link 1646) disengaged from the docking portion 1644*a* (of the locking block 1644) (referring to the state shown by FIG. 12). At this moment, the locking block 1644 will be pushed into the locking slot 162a by the restoring elements 1654, as shown by FIG. 13 (where the locking block 1644 is inserted into the locking slot 162*a*, referring to FIG. 4). So far, the operation of manually unfolding the side protection block 164 is completed. Therein, the side protection block 164 is in the unfolded state, and the locking block 1644 inserted into the locking slot 162*a* can remain the side protection block 164 in the unfolded state. In addition, if it is required to fold the side protection block 164 shown by FIG. 13 (where the locking block 1644 is inserted into the locking slot 162*a*), the user can move the operating part 1652 to move the locking block 1644, so as to make the locking block 1644 disengaged from the locking slot 162*a* and make the connecting portion 1646*b* (of the connecting link 1646) connect with the docking portion 1644*a* (of the locking block 1644) under the effect of the restoring element 1646*c*, as shown by FIG. 10. Afterwards, the side protection block 164 can be rotated by the user's hand or driven by the motor 166 to rotate to the folded position (as shown by FIG. 9).

Figure 12:
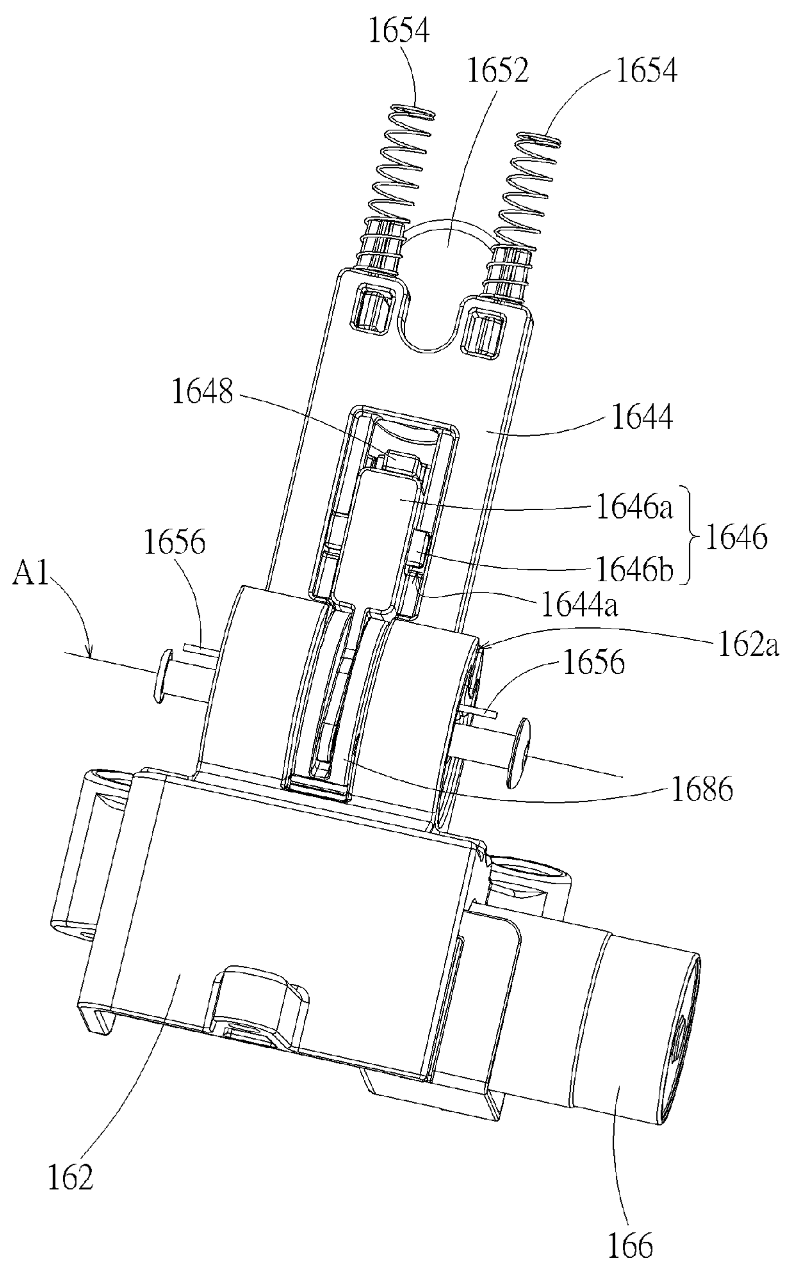
FIG. 12 is a schematic diagram illustrating the disengagement of a connecting portion of a connecting link from a docking portion of a locking block in the side protection mechanism.
Figure 13:
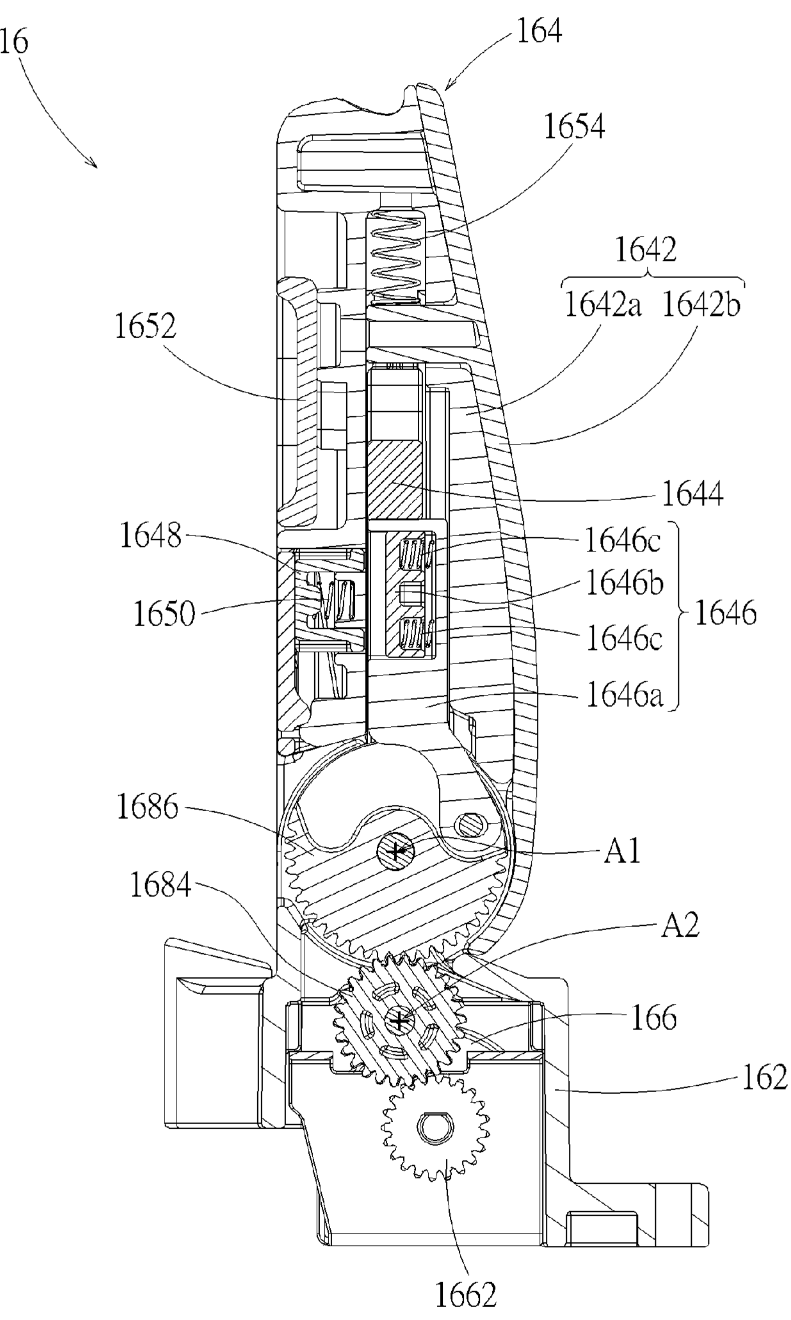
FIG. 13 is a sectional view of the side protection mechanism in FIG. 10 after the connecting link is disengaged from the locking block to make the locking block be inserted into the locking slot.
Figure 14:
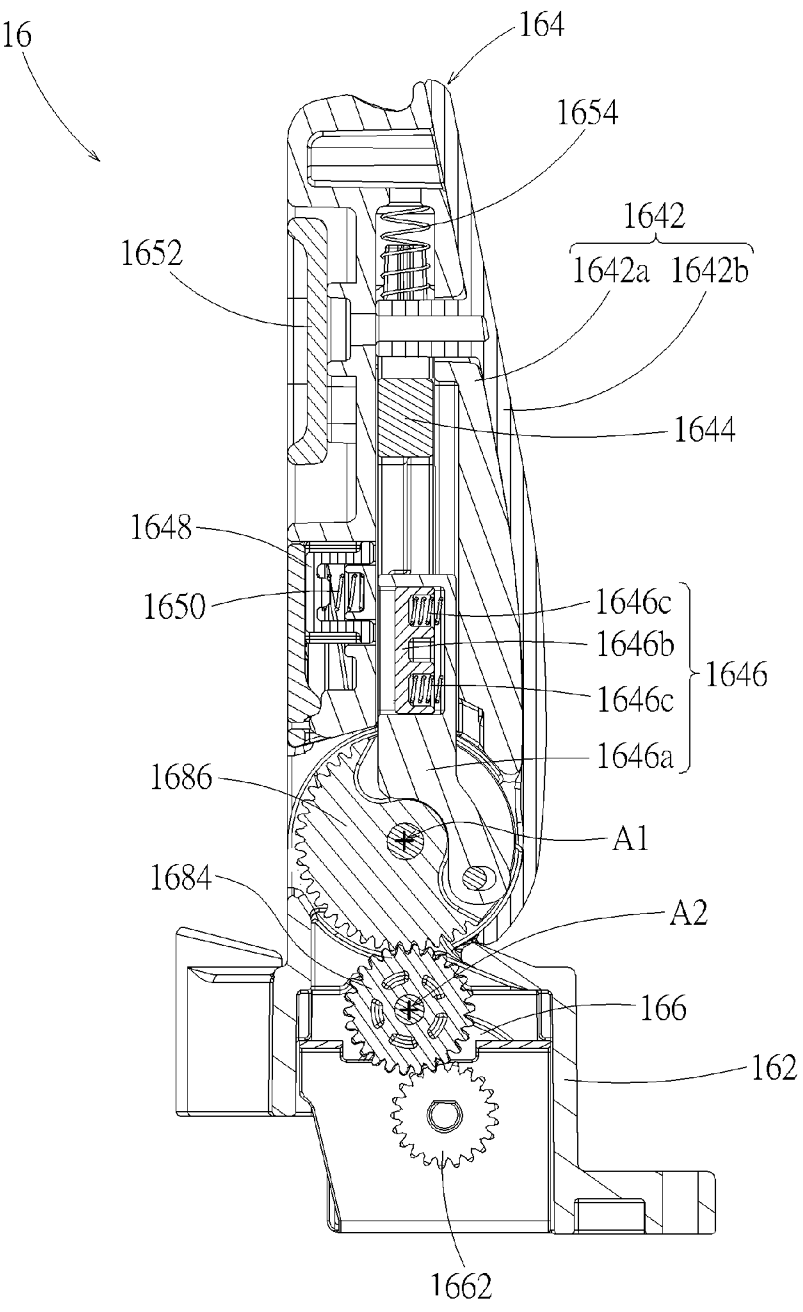
FIG. 14 is a sectional view of the side protection mechanism in FIG. 7 after the connecting link is disengaged from the locking block and the locking block is separated from the locking slot.
Figure 15:
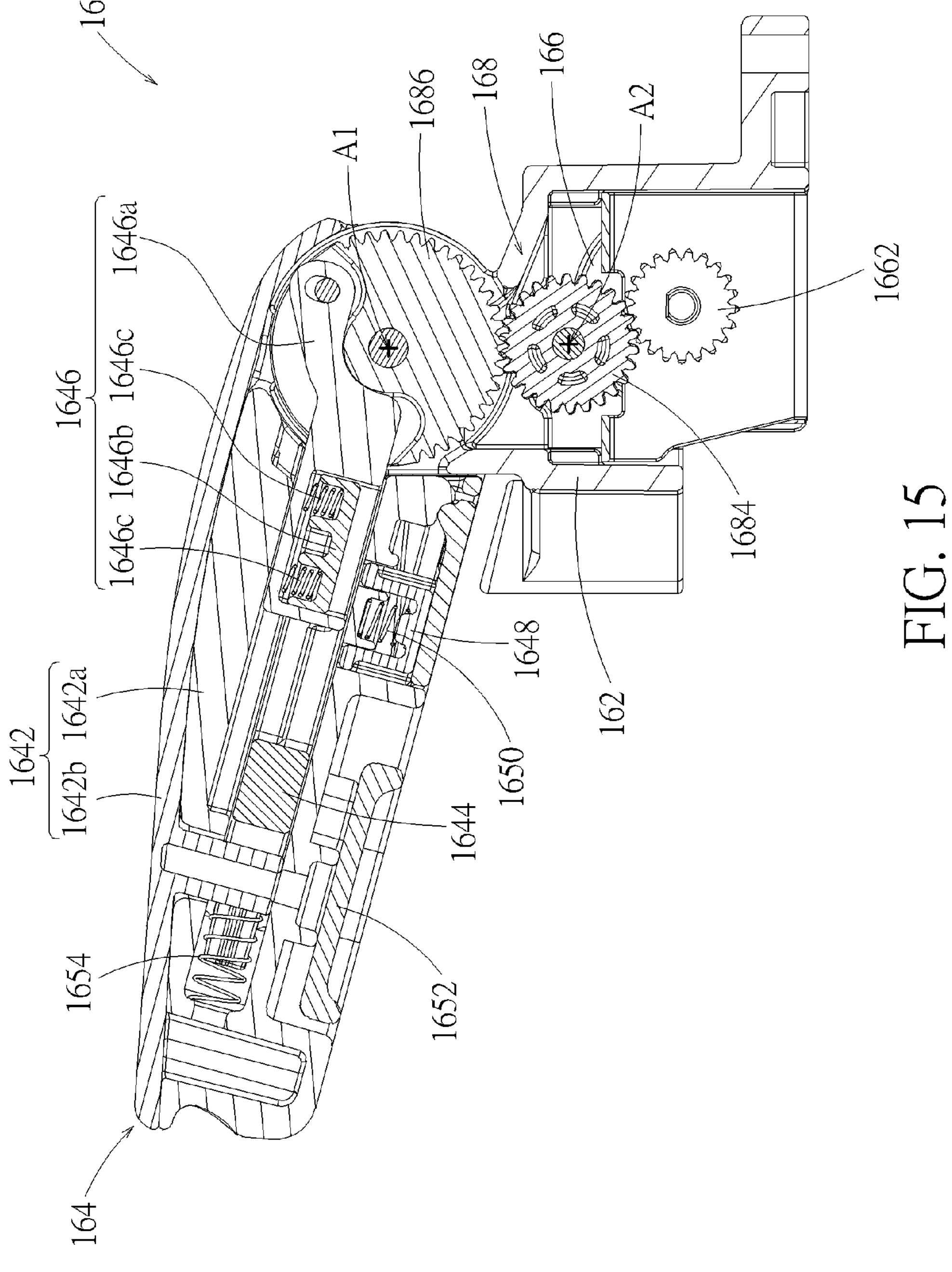
FIG. 15 is a sectional view of the side protection mechanism in FIG. 14 after the side protection block is folded.

For another example, when the side protection block 164 is in the unfolded state shown by FIG. 7 (where the locking block 1644 is inserted to the locking slot 162*a*), the user can press the press part 1648 to make the connecting portion 1646*b* (of the connecting link 1646) disengaged from the docking portion 1644*a* (of the locking block 1644) (as shown by FIG. 12), and move the operating part 1652 to move the locking block 1644, so that the locking block 1644 is separated from the locking slot 162*a*, as shown by FIG. 14. Then, the user can rotate the side protection block 164 to the folded position (as shown by FIG. 15). So far, the operation of manually folding the side protection block 164 is completed. In addition, in the side protection block 164 in FIG. 15, the locking block 1644 and the connecting link 1646 are not connected, but the motor 166 still can drive the connecting link 1646 through the gear set 168 to rotate together with the casing 1642 (or the side protection block 164). When the side protection block 164 is rotated to the unfolded position so that the locking block 1644 is located outside and directly in front of the locking slot 162*a* (i.e., the state as shown by FIG. 14), the locking block 1644 is pushed by the restoring elements 1654 to be inserted into the locking slot 162*a*, as shown by FIG. 7. Therein, in principle, during the insertion of the locking block 1644 into the locking slot 162*a*, the connecting portion 1646*b* of the connecting link 1646 is engaged with the docking portion 1644*a* of the locking block 1644 again. Therefore, the manually-folded side protection block 164 will not interfere with the unfolding of the power-driven side protection block 164.

Figure 6:
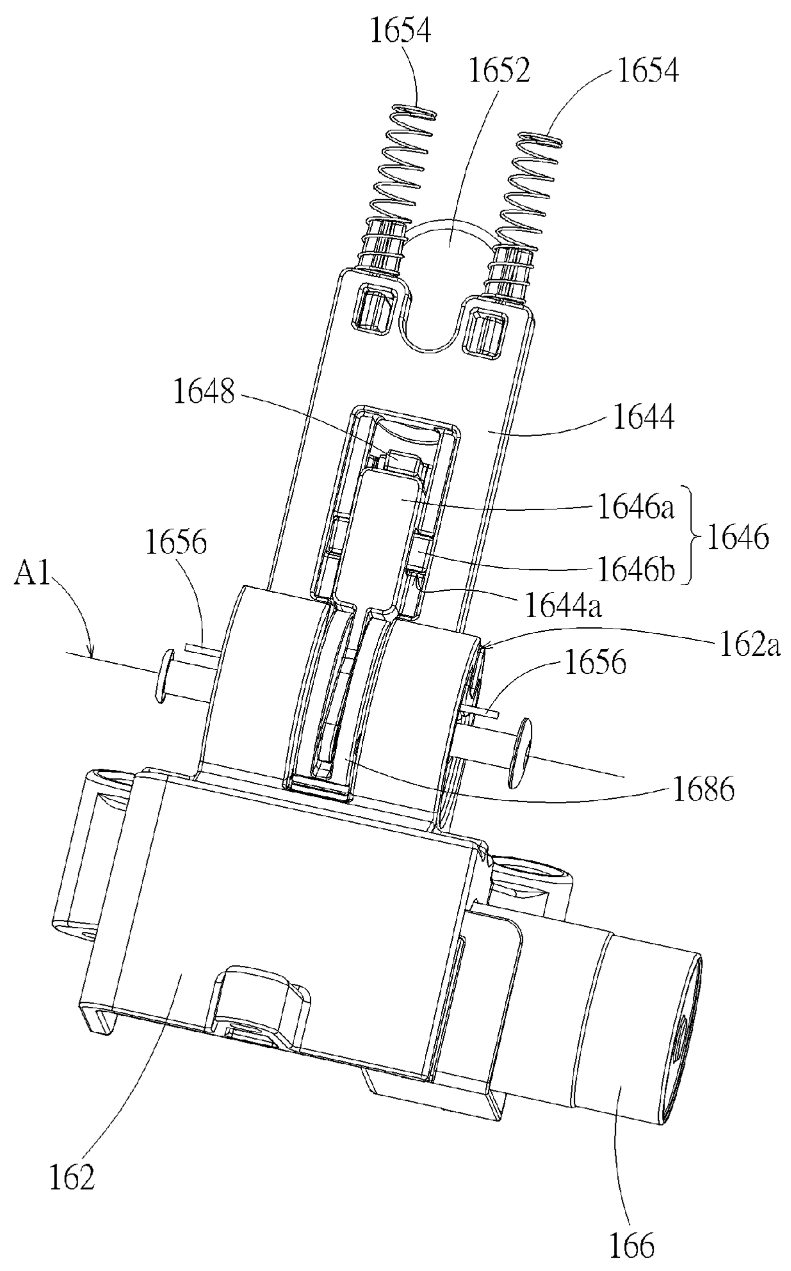
FIG. 6 is a schematic diagram illustrating the side protection mechanism in FIG. 3 in another view point after some components of the side protection block are removed.

In addition, please refer to FIG. 5, FIG. 6 and FIG. 8. In the embodiment, the side protection block 164 includes a restoring element 1656 (e.g., a torsion spring) which is connected to the pivotal connection mount 162 and the casing 1642. The restoring element 1656 drives the side protection block 164 to rotate toward the folded position, which helps the side protection block 164 to remain in the folded position for storage convenience.

As described above, both folding and unfolding of the side protection block 164 of the side protection mechanism 16 can be realized manually by the user or electrically driven (powered by the motor 166). Manual drive or electric drive can be mixed in the actions of unfolding and folding (for example, the side protection block 164 is manually unfolded, and then the side protection block 164 is folded by electric drive; for another example, the side protection block 164 is unfolded by electric drive, and then the side protection block 164 is manually folded) without interfering with each other. Therefore, the side protection mechanism 16 has large operational flexibility and is convenient for users to operate, which can effectively solve the problem that the side protection function of the side protection block 164 fails or is greatly reduced due to user negligence. Furthermore, the locking block 1644 of the side protection block 164 and the connecting link 1646 are connected in a detachable manner. After the locking block 1644 is disengaged from the connecting link 1646, the degree of structural interference between the side protection block 164 and the gear set 168 is reduced, and the rotation of the side protection block 164 relative to the pivotal connection mount 162 is less affected by the gear set 168. This helps to reduce the force required to manually rotate the side protection block 164, and also helps to reduce the required structural strength of the side protection mechanism 16.

Therefore, after the side protection mechanism 16 is installed on the safety seat 1, the unfolded side protection block 164 can improve the side impact prevention capability of the safety seat 1. By controlling the operation of the motor 166, the side protection block 164 can be driven to fold or unfold, which is convenient for the user to operate, and effectively solves the problem in the prior art that the side protection function of the side protection block fails or is greatly reduced due to user negligence.

The foregoing are only preferred embodiments of the disclosure while the protection scope thereof is not limited to the above description. Any change or substitution within the technical scope disclosed by the disclosure should be covered by the protection scope of the disclosure.

The invention claimed is:

1. A side protection mechanism disposed on a safety seat, the side protection mechanism comprising:

a pivotal connection mount having a locking slot;

a side protection block pivotally connected to the pivotal connection mount, the side protection block comprising a locking block; and a motor disposed in the pivotal connection mount, the motor being connected to the side protection block to drive the side protection block to rotate relative to the pivotal connection mount to fold or unfold, wherein after the side protection block rotates to unfold, the locking block is located outside the locking slot and directly in front of the opening of the locking slot.

2. The side protection mechanism according to claim 1, wherein the motor is connected to the side protection block through a gear set, the side protection block comprises a casing and a connecting link, the casing is pivotally connected to the pivotal connection mount, the locking block is movably disposed in the casing, the connecting link connects the locking block and the gear set, and the motor drives the side protection block through the gear set, the connecting link, and the locking block to rotate relative to the pivotal connection mount.

3. The side protection mechanism according to claim 2, wherein after the side protection block rotates to unfold, the motor drives the locking block through the gear set and the connecting link to be inserted into the locking slot.

4. The side protection mechanism according to claim 2, wherein the gear set comprises a driving gear, a clutch gear, and a driven gear, the motor engages with the driving gear, the driving gear and the clutch gear are arranged coaxially and axially detachably engage with each other, the clutch gear engages with the driven gear, and the driven gear is connected to the connecting link.

5. The side protection mechanism according to claim 4, wherein the gear set comprises a restoring element, and the restoring element abuts against the driving gear or the clutch gear so that the driving gear and the clutch gear engage with each other.

6. The side protection mechanism according to claim 4, wherein the driving gear and the clutch gear are axially detachably engaged with each other through wave teeth.

7. The side protection mechanism according to claim 4, wherein the connecting link is rotatably connected with the driven gear.

8. The side protection mechanism according to claim 2, wherein the connecting link comprises a connecting portion, the connecting link is connected to the locking block through the connecting portion, the locking block has a docking portion, and the connecting portion is detachably connected to the docking portion.

9. The side protection mechanism according to claim 8, wherein the connecting portion comprises a protruding block, the docking portion comprising a recess, and the connecting portion is detachably connected to the docking portion by the protruding block fitting in the recess.

10. The side protection mechanism according to claim 8, wherein corresponding to a situation where the locking block is aligned with the locking slot and the connecting portion is disengaged from the docking portion, the locking block is movable to be inserted into the locking slot.

11. The side protection mechanism according to claim 8, wherein the side protection block comprises a restoring element abutting against the locking block and having a constant tendency to move the locking block toward the locking slot.

12. The side protection mechanism according to claim 11, wherein the restoring element is located between the casing and the locking block.

13. The side protection mechanism according to claim 8, wherein corresponding to a situation where the locking block is aligned with the locking slot- and the connecting portion is disengaged from the docking portion, the restoring element pushes the locking block into the locking slot.

14. The side protection mechanism according to claim 8, wherein the side protection block comprises an operating part, the operating part is connected to the locking block, and the operating part is operable to move the locking block.

15. The side protection mechanism according to claim 14, wherein the operating part is operable to make the operating part and the locking block move in a same direction.

16. The side protection mechanism according to claim 14, wherein the operating part is exposed from a surface of the casing.

17. The side protection mechanism according to claim 8, wherein the side protection block comprises a press part exposed from the casing, and corresponding to a situation where the locking block is aligned with the locking slot, the connecting portion is disengaged from the docking portion by pressing the press part to move the connecting portion.

18. The side protection mechanism according to claim 2, wherein the side protection block comprises a restoring element, connected to the pivotal connection mount and the casing.

19. The side protection mechanism according to claim 1, wherein the pivotal connection mount has an outer surface adjacent to the locking slot, and corresponding to a situation where the motor drives the side protection block to rotate relative to the pivotal connection mount, the locking block moves on the outer surface.

20. A safety seat, comprising a seat body, the safety seat comprising the side protection mechanism according to claim 1, the pivotal connection mount of the side protection mechanism being disposed on a side of the seat body, wherein after the side protection block rotates to unfold, the side protection block protrudes from the seat body.

* * * * *